(12) United States Patent
Enta (10) Patent No.: US 9,936,134 B2
(45) Date of Patent: Apr. 3, 2018

(54) ACTUATOR, CAMERA MODULE, AND CAMERA MOUNTING DEVICE

(71) Applicant: Yohei Enta, Tokyo (JP)

(72) Inventor: Yohei Enta, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/539,351

(22) PCT Filed: Dec. 22, 2015

(86) PCT No.: PCT/JP2015/006402
§ 371 (c)(1),
(2) Date: Jun. 23, 2017

(87) PCT Pub. No.: WO2016/103687
PCT Pub. Date: Jun. 30, 2016

(65) Prior Publication Data
US 2017/0353662 A1 Dec. 7, 2017

(30) Foreign Application Priority Data

Dec. 24, 2014 (JP) .................... 2014-260694

(51) Int. Cl.
*G03B 17/00* (2006.01)
*H04N 5/232* (2006.01)
*G02B 27/64* (2006.01)

(52) U.S. Cl.
CPC ....... *H04N 5/23261* (2013.01); *G02B 27/646* (2013.01); *H04N 5/23287* (2013.01);
(Continued)

(58) Field of Classification Search
USPC ........................................ 396/425
See application file for complete search history.

(56) References Cited

U.S. PATENT DOCUMENTS 9,300,874 B1 * 3/2016 Lu .................... H04N 5/2254
9,746,690 B2 * 8/2017 Enta .................... G02B 27/646
(Continued)

FOREIGN PATENT DOCUMENTS

JP 2009-128377 A 6/2009
JP 2010-286810 A 12/2010
(Continued)

OTHER PUBLICATIONS

International Search Report from International Application No. PCT/JP2015/006402 dated Apr. 5, 2016.

*Primary Examiner* — Rodney Fuller
(74) *Attorney, Agent, or Firm* — Brundidge & Stanger, P.C.

(57) ABSTRACT

The purpose of the present invention is to provide an actuator which can realize a further reduction in height. Provided is an actuator which performs shake correction by tilting a driven member using the drive force of a voice coil motor, wherein a support part tiltably supports a movable body with respect to a fixed body in which one from between a magnet part and a coil part is disposed on a base member, the movable body being configured so that the other from between the magnet part and the coil part is disposed on a frame-shaped retaining member on which the driven member is mounted. The retaining member has steps, and these steps enable a mounting site of the driven member to be closer to the base member than the disposition site of the one from between the coil part and the magnet part.

14 Claims, 9 Drawing Sheets

(52) U.S. Cl.
CPC ............... *G03B 2205/0007* (2013.01); *G03B 2205/0069* (2013.01)

(56) References Cited

U.S. PATENT DOCUMENTS

| | | | |
|---|---|---|---|
| 2009/0052037 A1* | 2/2009 | Wernersson | G02B 27/646 359/554 |
| 2011/0150442 A1* | 6/2011 | Ollila | G03B 3/10 396/55 |
| 2015/0077852 A1* | 3/2015 | Lam | G02B 7/04 359/557 |
| 2015/0146025 A1* | 5/2015 | Bang | G02B 7/08 348/208.99 |
| 2015/0153584 A1* | 6/2015 | Yasuda | G02B 27/646 359/557 |
| 2015/0195460 A1* | 7/2015 | Yasuda | G02B 27/646 348/208.11 |
| 2016/0349528 A1* | 12/2016 | Kishine | G03B 5/00 |
| 2017/0045753 A1* | 2/2017 | Enta | G02B 7/04 |
| 2017/0331993 A1* | 11/2017 | Xu | H04N 5/2257 |

FOREIGN PATENT DOCUMENTS

| | | |
|---|---|---|
| JP | 2014-010287 A | 1/2014 |
| JP | 2015-152795 A | 8/2015 |
| JP | 2015-188142 A | 10/2015 |

\* cited by examiner

ACTUATOR, CAMERA MODULE, AND CAMERA MOUNTING DEVICE

TECHNICAL FIELD

The present invention relates to a hand-shake correction actuator, a camera module having a hand-shake correction function, and a camera-mounted device.

BACKGROUND ART

In general, a small-sized camera module is mounted in mobile terminals such as smartphones. Such a module often has an auto-focusing function for automatically focusing at the time of capturing a subject and a hand-shake correction function (OIS: Optical Image Stabilization) for reducing irregularities of an image by correcting hand shake (vibration) caused at the time of capturing an image.

As a hand-shake correction method, a module tilt method is known in which an imaging module is integrally tilted (for example PTL 1). The imaging module is a module having a lens part and an imaging device (for example, a charge coupled device (CCD)), which may be provided with an auto-focusing actuator.

In the following descriptions, the auto-focusing actuator is referred to as "AF actuator," and the hand-shake correction actuator is referred to as "OIS actuator."

Figure 1:
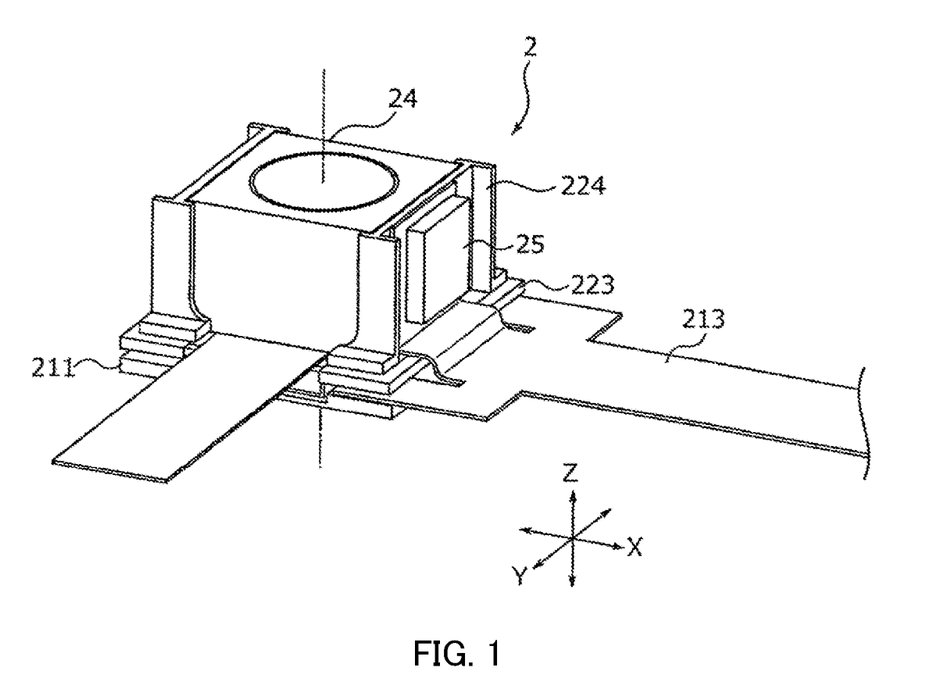
FIG. 1 is an external view illustrating an exemplary camera module of a traditional module tilt type.
Figure 2:
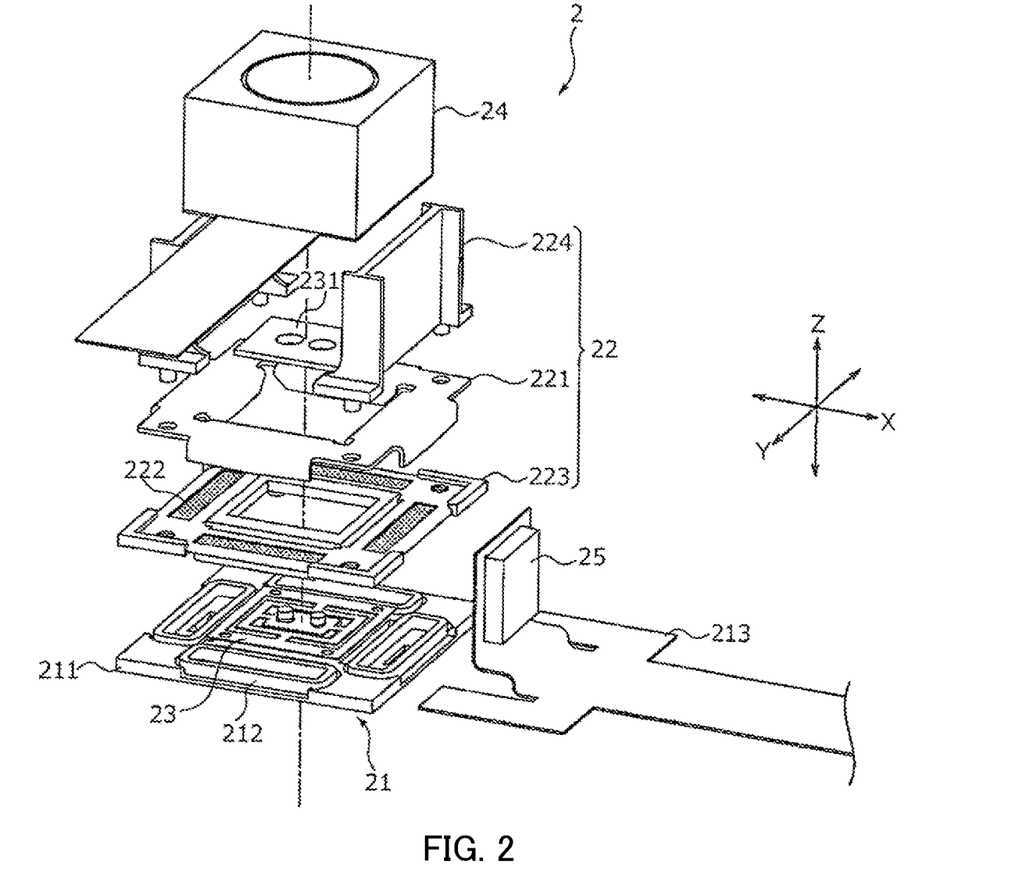
FIG. 2 is an exploded perspective view illustrating the exemplary camera module of a traditional module tilt type.

FIG. 1 is an external view illustrating an exemplary camera module of a traditional module tilt type. FIG. 2 is an exploded perspective view illustrating the exemplary camera module of a traditional module tilt type.

As illustrated in FIGS. 1 and 2, camera module 2 of a traditional module tilt type includes fixing part 21, movable part 22, elastic supporting part 23, imaging module 24, and shake detection part 25. An OIS actuator is composed of fixing part 21, movable part 22, and elastic supporting part 23.

Fixing part 21 includes base member 211, coil part 212, and OIS print wiring board 213. Coil part 212 is disposed on base member 211. OIS print wiring board 213 feeds power to coil part 212, and outputs a detection signal of shake detection part 25 to a control part.

Movable part 22 includes yoke 221, magnet part 222, top plate 223, and module guide 224. Yoke 221 and magnet part 222 are disposed in respective housing sections formed in top plate 223. Module guide 224 is fixed to top plate 223. Imaging module 24 is fixedly disposed in a space sandwiched between a pair of module guides 224.

Elastic supporting part 23 has a biaxial gimbal mechanism, and movable part 22 (top plate 223) is fixed to an outer gimbal. Elastic supporting part 23 is disposed at an approximate center of base member 211 in a floating fashion, and fixed by stopper 231. Elastic supporting part 23 supports movable part 22 such that movable part 22 can rotationally sway around the X axis and the Y axis orthogonal to the optical axis (Z axis), that is, elastic supporting part 23 supports movable part 22 such that movable part 22 can be tilted.

Shake detection part 25 is composed of a gyro sensor that detects the angular velocity of imaging module 24, for example. Shake detection part 25 is fixed to a side surface of module guide 224 of movable part 22. The detection signal of shake detection part 25 is output to the control part through OIS print wiring board 213 that constitutes fixing part 21.

An OIS voice coil motor (VCM) is composed of coil part 212 and magnet part 222. That is, when a current flows through coil part 212, a Lorentz force is generated at coil part 212 by interaction between the magnetic field of magnet part 222 and a current flowing through coil part 212 (Fleming's left hand rule). Since coil part 212 is fixed, a reactive force is exerted on magnet part 222. This reactive force is the driving force of the OIS voice coil motor. Movable part 22 rotationally sways until the driving force of the OIS voice coil motor and the restoration force (returning force) of elastic supporting part 23 become equivalent to each other. In this manner, shift of the optical axis due to hand shake is corrected, and the orientation of the light axis is kept at an orientation.

CITATION LIST

Patent Literature

PTL 1
Japanese Patent Application Laid-Open No. 2014-10287

SUMMARY OF THE INVENTION

Technical Problem

In recent years, along with thickness reduction of mobile terminals, further height reduction of camera modules has been desired. However, the above-described traditional structure uses module guide 224, stopper 231, and the like for the purpose of positioning and fixation, and therefore further height reduction is difficult in the traditional structure.

An object of the present invention is to provide an actuator, camera module, and camera-mounted device that can achieve further height reduction. In particular, this object is to provide an actuator, camera module, and camera-mounted device that can achieve further height reduction more surely by reason that a placement region for a driven part (for example, imaging module) is lowered. The present invention also intends to provide an actuator, camera module, and camera-mounted device in which it is possible to achieve height reduction and also to reduce the power consumption by improving the magnetic efficiency.

Solutions to Problems

An actuator according to the present invention is configured to correct shake by tilting a driven part with a driving force of a voice coil motor including a coil part and a magnet part, and to include: a fixing part which includes a base member and in which one of the coil part and the magnet part is disposed on the base member peripherally with respect to the driven part; a movable part including a frame-shaped holding member having a surface which faces away from the base member and on which the driven part is placed, the movable part being a part in which the other one of the coil part and the magnet part is disposed peripherally with respect to the driven part on a surface of the holding member facing the base member; and a supporting part disposed to the base member, and configured to support the movable part such that the movable part is tiltable with respect to the fixing part, in which the holding member includes a step by which a placement region for the driven part is closer to the base member than a disposition region for the one of the coil part and the magnet part is to the base member.

A camera module according to the present invention is configured to include: the above actuator; an imaging module including a lens part and an imaging device, and bonded to the holding member as the driven part; and a shake detection part that detects shake of the imaging module.

A camera-mounted device according to the present invention is configured to be an information device or a transporting device, and to include the above camera module.

Advantageous Effects of Invention

According to the present invention, the number of components is small in comparison with the traditional construction, and therefore it is possible to achieve further height reduction and facilitation of assembling processes. In particular, a placement region for a driven part (for example, imaging module) is lowered, and therefore further height reduction can be more surely achieved. In addition, it is possible to achieve height reduction, and also to reduce the power consumption by improving the magnetic efficiency since positions of coil and magnet parts are not restraint by the height reduction.

DESCRIPTION OF EMBODIMENTS

In the following, an embodiment of the present invention is described in detail with reference to the drawings.

Figure 3A:
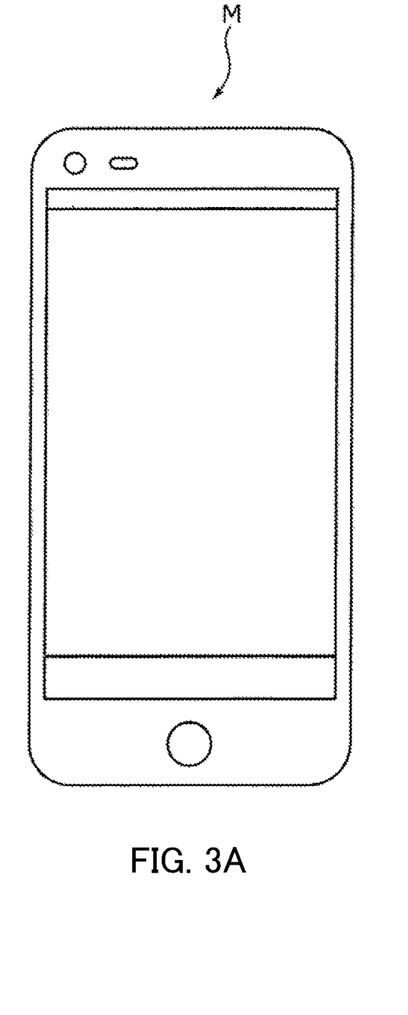
FIGS. 3A and 3B illustrate a smartphone in which a camera module according to an embodiment of the present invention is mounted.
Figure 3B:
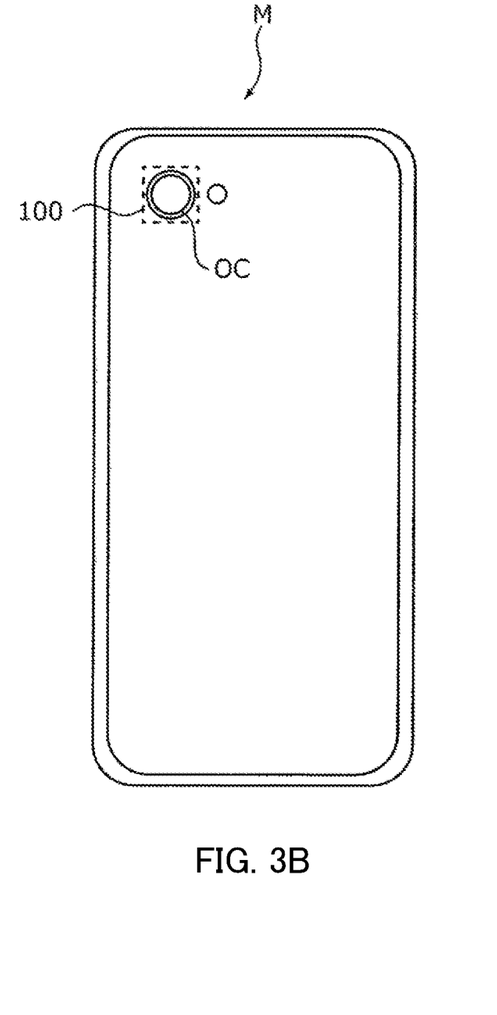

FIGS. 3A and 3B illustrate smartphone M in which camera module 100 according to an embodiment of the present invention is mounted. FIG. 3A is a front view of smartphone M, and FIG. 3B is a rear view of smartphone M.

For example, smartphone M is provided with camera module 100 as a back side camera OC. Camera module 100 has an auto-focusing function and a hand-shake correction function, and can capture an image without image blurring by automatically performing focusing at the time of capturing a subject and by correcting hand shake (vibration) caused at the time of capturing an image. The hand-shake correction function of camera module 100 is of a module tilt type. The module tilt type is advantageous in that no deformation is caused at four corners of the screen.

Figure 4:
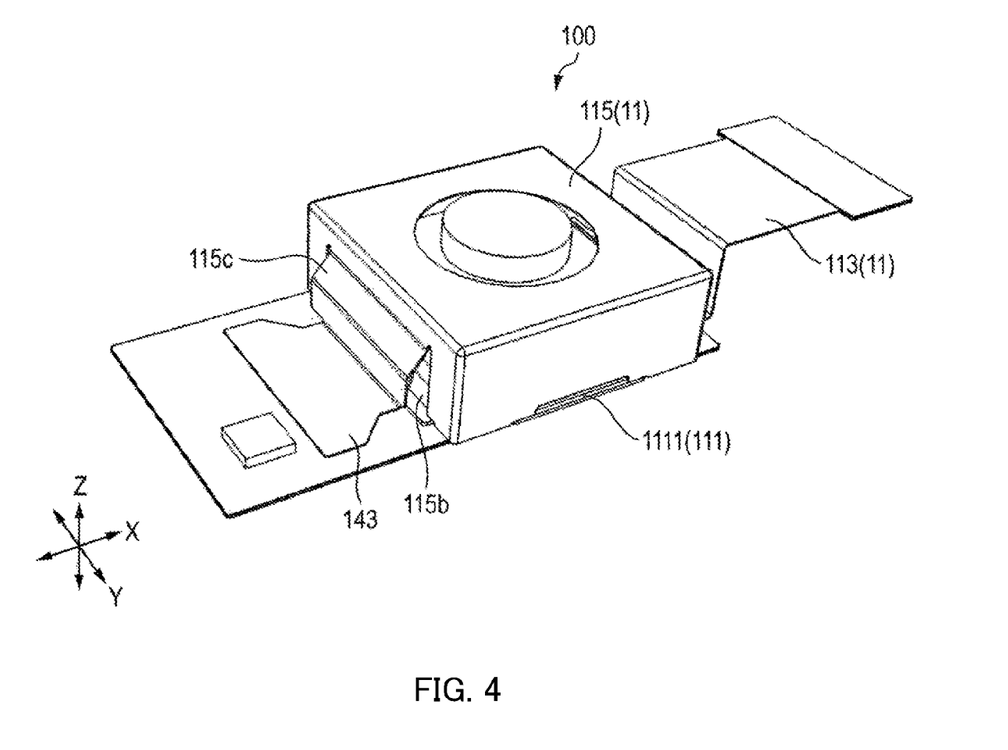
FIG. 4 is a perspective view of an external appearance of the camera module.
Figure 5:
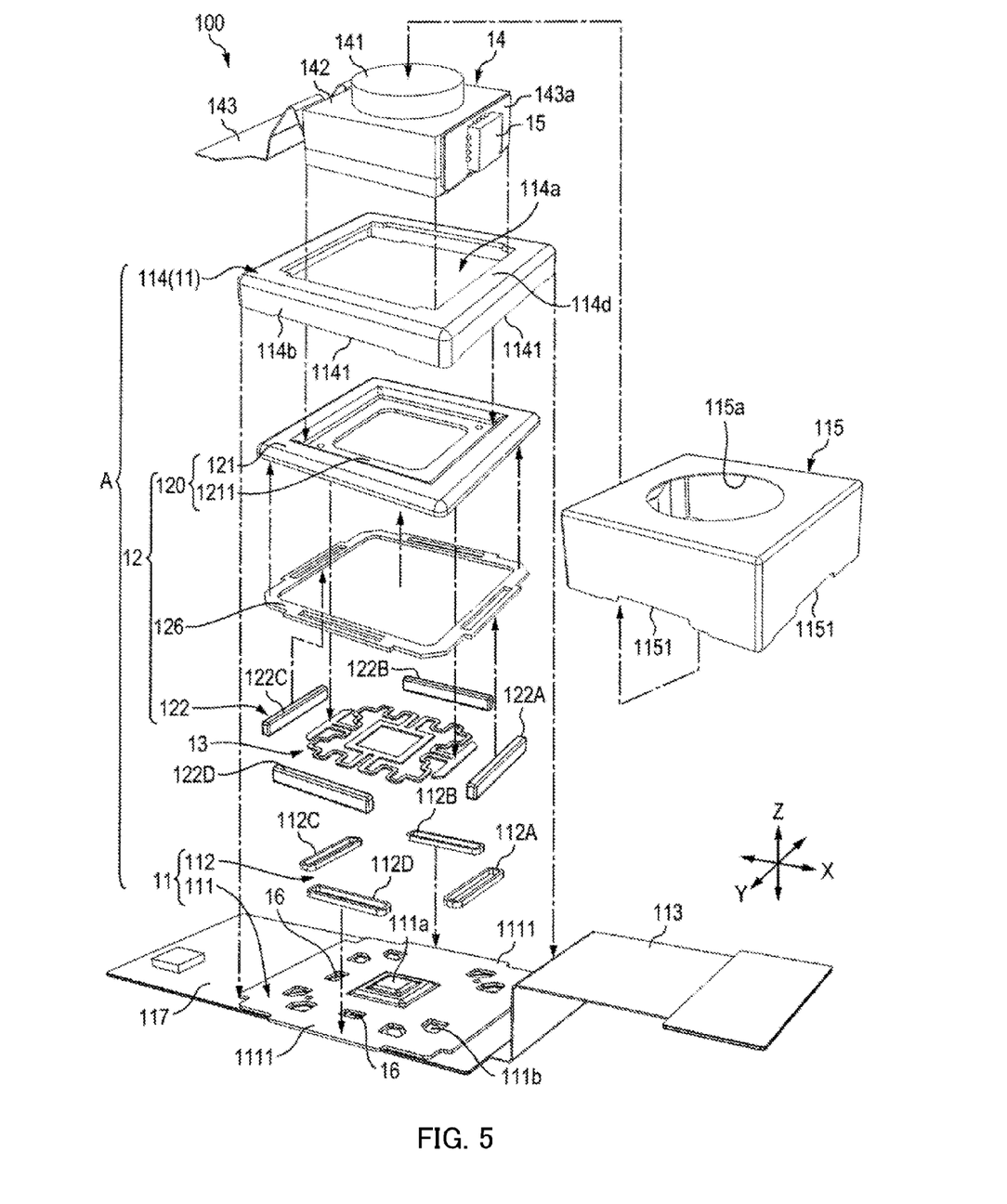
FIG. 5 is an exploded perspective view of the camera module.
Figure 6:
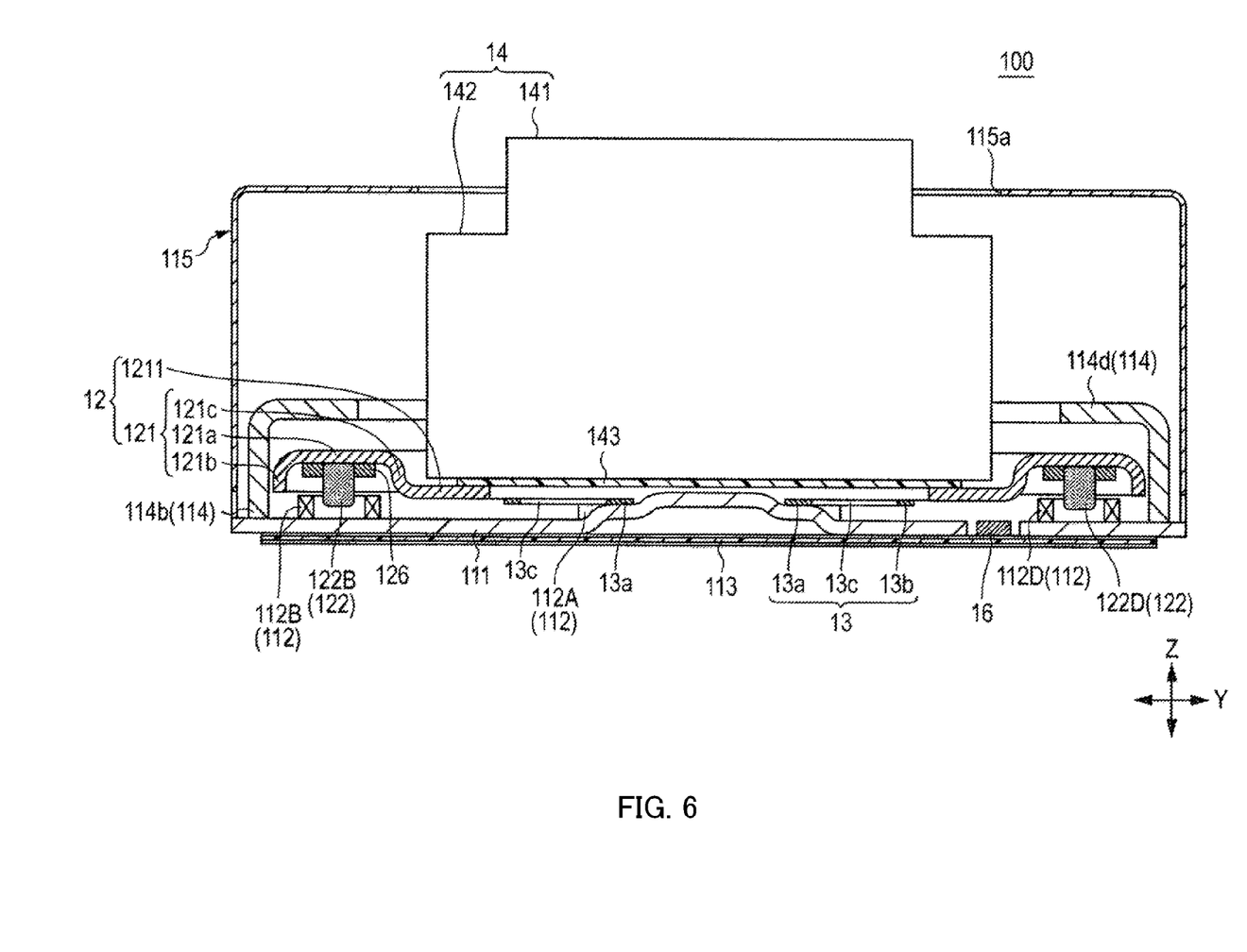
FIG. 6 is a sectional view along the Y direction of the camera module.
Figure 7:
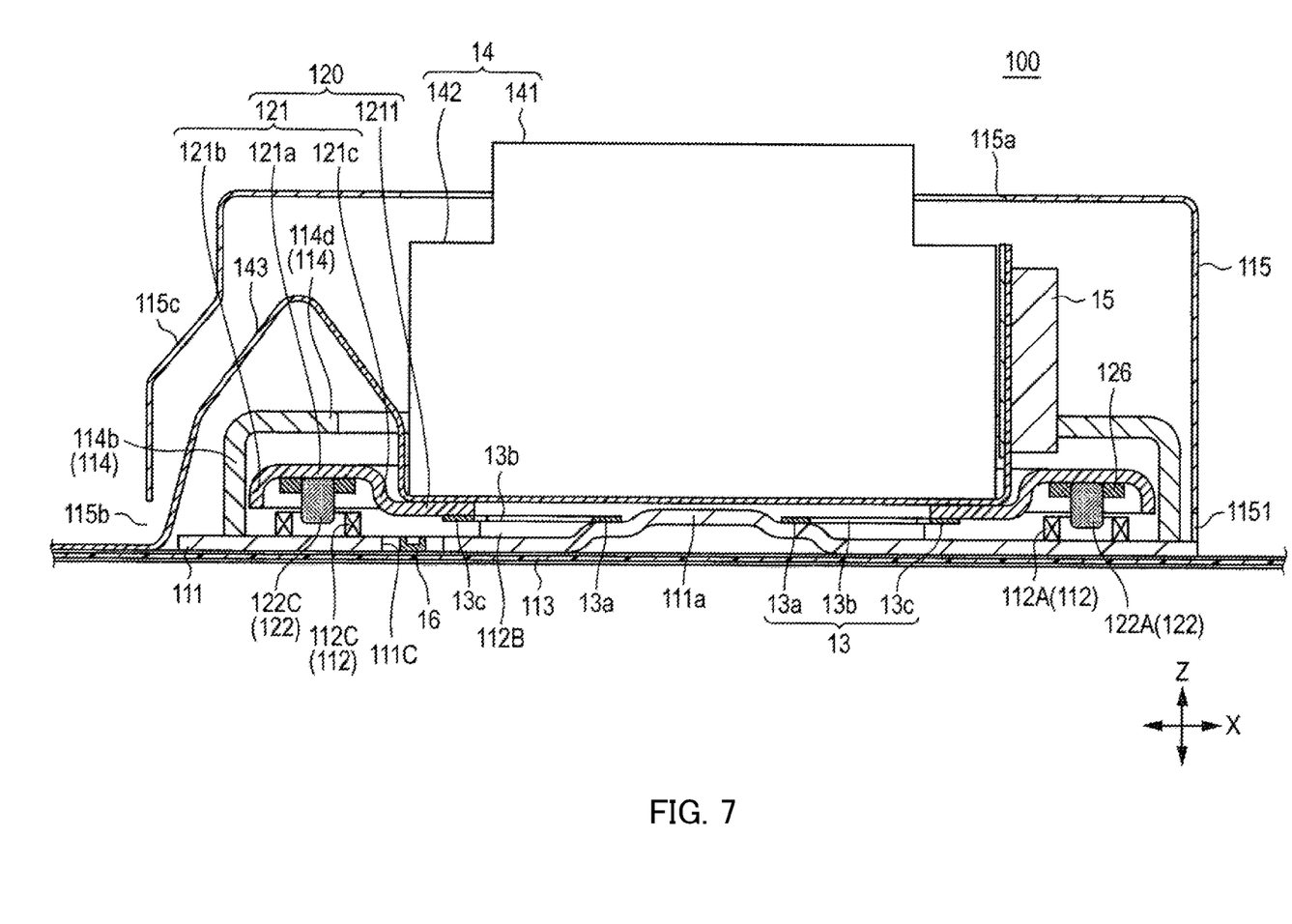
FIG. 7 is a sectional view along the X direction of the camera module.

FIG. 4 is a perspective view of an external appearance of camera module 100. FIG. 5 is an exploded perspective view of camera module 100. FIG. 6 is a sectional view of camera module 100 along the Y direction. FIG. 7 is a sectional view of camera module 100 along the X direction. In this respect, FIGS. 6 and 7 particularly illustrate a magnetic circuit part that is a voice coil motor.

Here, as illustrated in FIG. 4 to FIG. 7, descriptions will be made with an orthogonal coordinate system (X, Y, Z). Camera module 100 is mounted such that the vertical direction (or horizontal direction) is the X direction, the horizontal direction (or vertical direction) is the Y direction, and the front-rear direction is the Z direction (optical axis direction) at the time of actually capturing an image with smartphone M.

As illustrated in FIG. 4 to FIG. 7, camera module 100 includes fixing part 11, movable part 12, elastic supporting part 13, imaging module 14, shake detection part 15, displacement detection part 16, and the like. OIS actuator A is composed of fixing part 11, movable part 12, and elastic supporting part 13. In OIS actuator A, hand-shake correction is performed with use of the driving force of an OIS voice coil motor including coil part 112 and magnet part 122.

Fixing part 11 is fixed so as to be unmovable when mounted in smartphone M. Fixing part 11 supports movable part 12 via elastic supporting part 13 such that movable part 12 is movable. Fixing part 11 includes base member 111, coil part 112, OIS print wiring board 113, skirt member (cover member) 114, main body cover member (hereinafter referred to as "cover member") 115, and print circuit board 117.

Base member 111 is a member formed of a metal material in a substantially rectangular shape, and is disposed on print circuit board 117. Base member 111 is formed of a metal, and as a result the strength is high in comparison with the case where base member 111 is formed of a resin. Thus the thickness of base member 111 can be reduced, and in turn, reduction of the height of camera module 100 can be achieved.

Base member 111 includes, at the center thereof, protruding part 111a having a truncated pyramid shape for fixing elastic supporting part 13. Base member 111 includes, at positions around protruding part 111a, power feeding parts 111b in the form of pads for supplying electricity to coil part 112. In base member 111, displacement detection parts 16 are disposed in cutout regions 111C provided at positions around protruding part 111a other than the positions of power feeding parts 111b.

Displacement detection part 16 is composed of a Hall device or the like, for example, and detects tilt of movable part 12, in particular, an offset of imaging module 14 due to its dead weight (dead weight sagging) when movable part 12 is attached to fixing part 11 via elastic supporting part 13, or detects an offset of imaging module 14 due to the reactive force of the FPC when imaging module 14 is attached to fixing part 11. In this manner, camera module 100 detects and corrects an offset position of imaging module 14 by means of displacement detection part 16, so that imaging module 14 can be precisely disposed without being tilted at the reference position for detection by shake detection part 15.

In addition, base member 111 includes, at the middle portions of four sides constituting the peripheral edge of base member 111, protruding side portions 1111 for positioning cover member 115 and skirt member 114 during fixation thereof. Protruding side portions 1111 are respectively engaged with cutouts 1141 and 1151 of skirt member 114 and cover member 115 when skirt member 114 and cover member 115 are attached to base member 111. In particular, by virtue of engagement of cutout 1141 with protruding side portion 1111, skirt member 114 is fit at the outside of the peripheral edge of base member 111 to be fixedly positioned. As for cover member 115, cutout 1151 is engaged with protruding side portion 1111 of base member 111, and cover member 115 is fit at the outside of the outer peripheral surface of skirt member 114. In this way, cover member 115 are also positioned by means of protruding side portions 1111 of base member 111.

Coil part 112 is composed of four tilt coils 112A to 112D and is disposed at base member 111 to surround protruding part 111a. Coil part 112 (tilt coils 112A to 112D) is disposed such that the winding axis of each coil is oriented in the direction in which base member 111 and yoke (holding member) 120 face each other (in this case, in the Z direction). Power is fed to coil part 112 (tilt coils 112A to 112D) through power feeding parts 111b.

Tilt coils 112A and 112C face each other in the X direction, and tilt coils 112A and 112C are used to rotationally sway movable part 12 around the Y axis. Tilt coils 112B and 112D face each other in the Y direction, and tilt coils 112B and 112D are used to rotationally sway movable part 12 around the X axis.

OIS print wiring board 113 includes a power-source line (not illustrated) for feeding power to coil part 112. OIS print wiring board 113 is fixed on the bottom surface of base member 111, and the power-source line is electrically connected with power feeding parts 111b of base member 111.

Skirt member 114 is a frame-shaped member composed of four walls 114b coupled with each other in a rectangular shape, and includes reception port 114a for imaging module 14. Skirt member 114 includes cutouts 1141 at positions corresponding to protruding side portions 1111 of base member 111, that is, at respective middle portions of lower ends of walls 114b of skirt member 114. Skirt member 114 includes, at upper portions of respective walls 114b, restriction parts 114d that slightly protrude from the respective upper portions toward the inside and form a rectangular frame, and restriction parts 114d prevent movable part 12 disposed in the frame, that is, in reception port 114a of skirt member 114 from being excessively tilted.

After movable part 12 is attached to base member 111 through elastic supporting part 13, skirt member 114 is fixed by being fit at the outside of the peripheral edge of base member 111. Movable part 12 is set between base member 111 and skirt member 114.

Cover member 115 is a capped rectangular cylindrical member, which includes opening 115a in the cap at the top surface of the cylindrical member. Opening 115a in cover member 115 allows lens part 141 of imaging module 14 to face outside. Cover member 115 includes, at the lower end of its cylindrical peripheral wall, cutouts 1151 formed at positions corresponding to protruding side portions 1111 of base member 111.

After imaging module 14 is mounted to OIS actuator A, cover member 115 is fit at the outside of skirt member 114 and cutouts 1151 are engaged with protruding side portions 1111 of base member 111, so that cover member 115 is fixed to base member 111. Drawing port 115b for imaging-module print wiring board 143 to be pulled to the outside is formed at one side surface of cover member 115. A part of one side surface of cover member 115 is processed so as to form outwardly projecting hood part 115c, and drawing port 115b is thus formed below hood part 115c.

Movable part 12 rotationally sways around the X axis and the Y axis with respect to fixing part 11. Movable part 12 includes yoke (holding member) 120, magnet part 122, and positioning plate 126. When imaging module 14 is mounted to OIS actuator A, yoke 120 directly holds imaging module 14. Imaging module 14 is bonded on the top surface of yoke 120 with a double-sided tape, resin adhesive agent, or the like, for example. With this construction, even without using positioning members such as the module guide disclosed in PTL 1, imaging module 14 can be fixed to yoke 120 with use of a jig while setting the position of imaging module 14 with high accuracy.

Yoke 120 is a rectangular frame-shaped member formed of a magnetic material, and includes rectangular frame-shaped yoke main body 121 (holding-part main body) and flat frame-shaped holding frame portion 1211 that is provided inside the frame shape of yoke main body 121 and fixes imaging module 14.

Yoke main body 121 includes flat frame-shaped top plate portion 121a composed of four flat plates which are coupled with each other in a rectangular shape. Magnet part 122 is fixed on the underside of top plate portion 121a. Yoke main body 121 includes outside droop portion 121b along the outer peripheral edge of top plate portion 121a (in particular, outer edge of each flat plate composing top plate portion 121a), outside droop portion 121b being formed in such a manner as to downwardly protruding and droop down. In addition, yoke main body 121 includes inside droop portion 121c along the inner peripheral edge of top plate portion 121a (in particular, inner edge of each flat plate composing top plate portion 121a), inside droop portion 121c being formed in such a manner as to downwardly protruding and droop down. That is, the cross-sectional shape of one side of yoke main body 121 has a recessed shape open toward base member 111, that is, a downwardly open U-shape. Top plate portion 121a that forms the bottom surface inside this recessed shape is located more distant from base member 111 than holding frame portion 1211 is from base member 111. In addition, the outer peripheral edge of holding frame portion 1211 is connected to the lower end of inside droop portion 121c of yoke main body 121. The bottom surface of imaging module 14 is fixed on the top surface of holding frame portion 1211 (a part of the top surface of yoke 120) with a double-sided tape or resin adhesive agent.

As described above, in yoke 120, top plate portion 121a of yoke main body 121 to which magnet part 122 is fixed is located, by way of inside droop portion 121c, more peripherally and higher than holding frame portion 1211 on which imaging module 14 is fixed. That is, top plate portion 121a is disposed at a position around holding frame portion 1211 and more distant from base member 111 than holding frame portion 1211 is from base member 111 in the Z direction.

With this construction, a step by which holding frame portion 1211 is closer to base member 111 than top plate portion 121a is to base member 111 is formed between holding frame portion 1211 and top plate portion 121a, and a recessed portion is formed in the center of entire yoke 120, in which imaging module 14 is fixed.

Magnet part 122 is composed of four cuboid permanent magnets 122A to 122D corresponding to tilt coils 112A to 112D. Electromagnets may be used in place of permanent magnets. Permanent magnets 122A to 122D have a size which can be put inside tilt coils 112A to 112D.

Permanent magnets 122A to 122D are disposed at the undersides of respective flat plates of yoke 120 such that the magnetization direction is the Z direction, and permanent magnets 122A to 122D are fixed by bonding, for example. In this case, permanent magnets 122A to 122D are fixed via positioning plate 126 formed in such a manner as to allow permanent magnets 122A to 122D to be disposed at predetermined positions. Positioning plate 126 is formed of a magnetic or non-magnetic material, has a shape corresponding to the shape of the underside of top plate portion 121a, and is provided with four slits at positions to which permanent magnets 122A to 122D are disposed. Positioning plate 126 is fixed to the underside of top plate portion 121a with a double-sided tape, adhesive agent, or the like, and permanent magnets 122A to 122D are fitted in the respective slits of positioning plate 126 in such a manner as to make contact with the underside of top plate portion 121a. In this manner, permanent magnets 122A to 122D are positioned and fixed with respect to yoke 120 with high precision (see FIGS. 6 to 8).

In addition, permanent magnets 122A to 122D are located between inside droop portion 121c and outside droop portion 121b of yoke 120. In this case, permanent magnets 122A to 122D face both of inside droop portion 121c and outside droop portion 121b, at which permanent magnets 122A to 122D are spaced apart from both of inside droop portion 121c and outside droop portion 121b.

Coil part 112 is located between magnet part 122 and yoke 120 (in particular, yoke main body 121) (see FIGS. 5 and 6). Magnet part 122 is located on the winding axis of winding of coil part 112. The central portion of coil part 112 are opened along the bonding direction of imaging module 14, and magnet part 122 and coil part 112 are respectively disposed to yoke 120 and base member 111 such that magnet part 122 protrudes to the central portion of coil part 112.

To be more specific, tilt coils 112A to 112D are located between outside droop portion 121b and permanent magnets 122A to 122D and between inside droop portion 121c and permanent magnets 122A to 122D. In this manner, the periphery of coil part 112 is covered with yoke 120, so that it is possible to prevent the AF actuator 142 of imaging module 14 from being unfavorably influenced by the magnetic field of the energization current of coil part 112.

In addition, magnet part 122 and coil part 112, namely the magnetic circuit part including magnet part 122 and coil part 112 are located peripherally with respect to the lower end of imaging module 14 and holding frame portion 1211 (in particular, farther in the X and Y directions). In other words, the magnetic circuit part including magnet part 122 and coil part 112 is not disposed directly below the lower end of imaging module 14 and holding frame portion 1211. That is, magnet part 122 (permanent magnets 122A to 122D) and coil part 112 (tilt coils 112A to 112D) are disposed on base member 111 peripherally with respect to the lower end of imaging module 14 and holding frame portion 1211 of yoke 120 in the X and Y directions.

Figure 8:
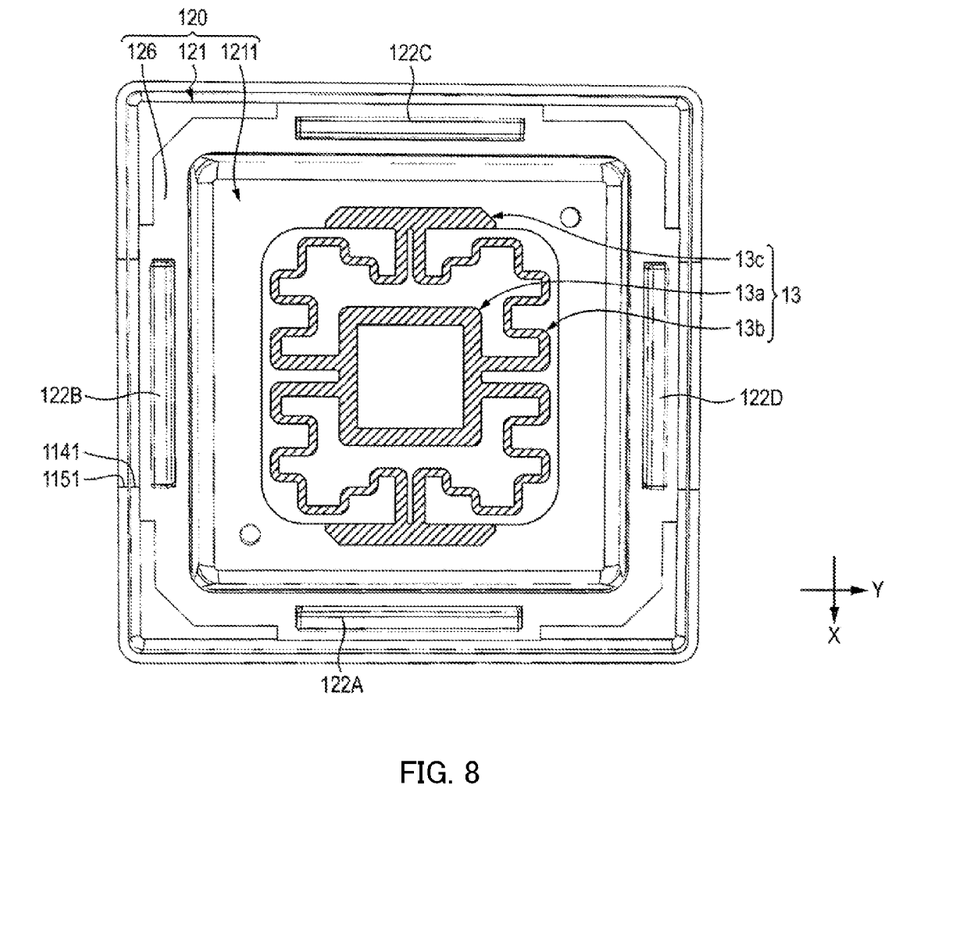
FIG. 8 is a bottom view of a yoke to which an elastic supporting part is attached.

Elastic supporting part 13 is composed of a rectangular member having a biaxial gimbal mechanism (so-called gimbal spring). FIG. 8 is a bottom view of a yoke to which an elastic supporting part is attached, and serves to explain the elastic supporting part.

As illustrated in FIG. 8, elastic supporting part 13 includes center portion 13a and outer gimbal 13c continuously connected with center portion 13a with inner gimbal 13b therebetween. Outer gimbal 13c rotationally sways around the X axis and the Y axis. It is to be noted that the gimbals that are elastic supporting part 13 are indicated by hatching in an attempt to differentiate them from the other components in FIG. 8. As illustrated in FIG. 8, center portion 13a has a rectangular frame shape, and inner gimbal 13b has a complex curved shape. Here, outer gimbal 13c includes two long plates, which are respectively arranged outside and in parallel with a pair of side portions of center portion 13a that face each other. Outer gimbal 13c is connected to one end of inner gimbal 13b at the middle of outer gimbal 13c.

In the meantime, the other end of the inner gimbal is connected to center portion 13a.

Center portion 13a of elastic supporting part 13 is fit at the outside of protruding part 111a of base member 111 and bonded or welded thereto. As a result, a peripheral portion with respect to center portion 13a of elastic supporting part 13 is located in such a manner as to be spaced apart from the top surface of base member 111 by a predetermined distance, as illustrated in FIG. 7. In this respect, this predetermined distance represents a range in which elastic supporting part 13 is movable when elastic supporting part 13 rotationally moves around the central axes in the X and Y directions that are directions in which elastic supporting part 13 is movable. In addition, as illustrated in FIG. 8, outer gimbal 13c of elastic supporting part 13 is bonded or welded to a pair of parallel side portions on the underside of holding frame portion 1211 of yoke 120. In this manner, movable part 12 is disposed at an approximate center of base member 111 in a floating fashion, and thus can rotationally sway around the X axis and the Y axis. Since elastic supporting part 13 is fixed to base member 111 by bonding, it is not necessary to provide lock members such as the stopper disclosed in PTL 1. Elastic supporting part 13 is attached via outer gimbal 13c to the underside of holding frame portion 1211, on the top surface of which imaging module 14 is bonded. Accordingly, the distance in the Z direction between elastic supporting part 13 and imaging module 14 substantially corresponds to the thickness of holding frame portion 1211. In this way, the length in the Z direction of camera module 100 itself can be reduced, that is, the height reduction of camera module 100 can be achieved.

Imaging module 14 includes lens part 141, an imaging device (not illustrated), AF actuator 142, and imaging-module print wiring board 143.

The imaging device (not illustrated) is composed of, for example, a CCD (charge coupled device) image sensor, a CMOS (complementary metal oxide semiconductor) image sensor, or the like. The imaging device (not illustrated) is mounted to imaging-module print wiring board 143. The imaging device (not illustrated) captures a subject image imaged by lens part 141.

AF actuator 142 includes an AF voice coil motor for example, and moves lens part 141 in the light axis direction by utilizing the driving force of AF voice coil motor. Publicly known techniques can be applied to AF actuator 142.

Imaging-module print wiring board 143 is here composed of flexible printed circuits having flexibility. Imaging-module print wiring board 143 includes a power-source line (not illustrated) configured to feed power to a coil part (not illustrated) of AF actuator 142, and a video signal line (not illustrated) for video signals output from the imaging device, and a detection signal line (not illustrated) for detection signals output from shake detection part 15. As illustrated in FIG. 7, imaging-module print wiring board 143 is pulled to the outside through drawing port 115b of cover member 115 from the inside of skirt member 114 and over skirt member 114 in the state where imaging module 14 is mounted in OIS actuator A. To be more specific, imaging-module print wiring board 143 extends out upwardly from the underside of imaging module 14, is bent to extend outwardly of a skirt portion, and then extends out from drawing port 115b of cover member 115. Imaging-module print wiring board 143 as pulled out is connected to print circuit board 117 of fixing part 11. As described above, imaging-module print wiring board 143 is flexible, and therefore does not disturb the movement of movable part 12 although imaging-module print wiring board 143 is provided in movable part 12. In the meantime, branching may be provided in imaging-module print wiring board 143 to equip the video signal line and the detection signal line with different connectors.

Shake detection part 15 detects shake (movement) of imaging module 14. Shake detection part 15 is composed of a gyro sensor that detects the angular velocity of imaging module 14, for example. Shake detection part 15 is mounted to upright part 143a of imaging-module print wiring board 143. The detection signal of shake detection part 15 is output to a control part through imaging-module print wiring board 143. The control part controls the energization current of coil part 112 based on the detection signal. In this respect, the control part (not illustrated) may be mounted on imaging-module print wiring board 143 or on print circuit board 117. In addition, a control part mounted on smartphone M may be utilized via the print wiring board.

In traditional camera module 2 (see FIGS. 1 and 2), shake detection part 25 is attached to movable part 22 (module guide 224), and the detection signal of shake detection part 25 is output through OIS print wiring board 213 serving as fixing part 21. The rotational sway of movable part 22 is inhibited by OIS print wiring board 213, and the sensitivity of the tilt operation is reduced, and as a result, the driving force of the OIS actuator is inevitably increased.

In contrast, in camera module 100 according to the embodiment, the detection signal of shake detection part 15 is output through imaging-module print wiring board 143 of imaging module 14. That is, OIS print wiring board 113 of fixing part 11 does not inhibit the rotational sway of movable part 12 (imaging module 14). Accordingly, the driving force of OIS actuator A can be reduced in comparison with the traditional technique, and the power consumption can be reduced. In addition, OIS print wiring board 113 of fixing part 11 is used only for power feeding to coil part 112, and therefore may be omitted by separately providing another power-source line. Consequently, cost reduction and space-saving can be achieved.

In OIS actuator A, coil part 112 and magnet part 122 constituting the magnetic circuit part of the OIS voice coil motor are disposed at positions surrounding imaging module 14 that is an object to be moved. In particular, the magnetic circuit part including magnet part 122 (permanent magnets 122A to 122D) and coil part 112 (tilt coils 112A to 112D) is disposed on base member 111 peripherally with respect to the lower end of imaging module 14 and holding frame portion 1211 of yoke 120 in the X and Y directions.

The magnetic circuit part is disposed at such a position that a part of the magnetic circuit part is superimposed on the lower end of imaging module 14 and holding frame portion 1211 of yoke 120 when viewed in the X and Y directions. In other words, the magnetic circuit part is disposed at such a position that one of magnet part 122 and coil part 112 (in this case, magnet part 122) is superimposed on the lower end of imaging module 14 and holding frame portion 1211 of yoke 120 when viewed in the X and Y directions.

In the magnetic circuit part, permanent magnets 122A to 122D constituting magnet part 122 are disposed above tilt coils 112A to 112D constituting coil part 112 and in such a manner as to be partially inserted inside tilt coils 112A to 112D. In this manner, permanent magnets 122A to 122D are disposed above respective tilt coils 112A to 112D along the winding axes directions of respective tilt coils 112A to 112D (Z direction). In addition, magnet part 122 and coil part 112 are disposed peripherally with respect to the lower end of imaging module 14 and holding frame portion 1211 of yoke 120 in the X and Y directions and at such a position that a part of the magnetic circuit part is superimposed on the lower end of imaging module 14 and holding frame portion 1211 of yoke 120.

In the OIS voice coil motor including magnet part 122 and coil part 112 disposed as described above, in an initial state where no current flows through coil part 112, imaging module 14 (movable part 12) is held at a neutral position where the optical axis coincides with the Z direction. In this respect, in a case where imaging module 14 (movable part 12) is offset from the neutral position due to dead weight sagging or the like when movable body 12 is attached to fixing part 11, an offset position detected by displacement detection part 16 is corrected to the neutral position where the optical axis coincides with the Z direction.

When a current flows through coil part 112, a Lorentz force in the Z direction is generated at coil part 112 by interaction between the magnetic field of magnet part 122 and the current flowing through coil part 112 (Fleming's left hand rule). Since coil part 112 is fixed, a reactive force is exerted on magnet part 122 that is movable part 12. This reactive force is the driving force of the OIS voice coil motor.

To be more specific, when opposite currents are supplied to tilt coils 112A and 112C facing each other in the X-axis direction, opposite forces in the Z direction act on permanent magnets 122A and 122C. Accordingly, movable part 12 including imaging module 14 rotationally sways around the Y axis with center portion 13a of elastic supporting part 13 as a fulcrum. Likewise, when opposite currents are supplied through tilt coils 112B and 112D facing each other in the Y-axis direction, movable part 12 including imaging module 14 rotationally sways around the X axis with center portion 13a of elastic supporting part 13 as a fulcrum. Movable part 12 rotationally sways until the driving force of the OIS voice coil motor (force which acts on magnet part 122) and the restoration force of elastic supporting part 13 become equivalent to each other.

At this time, the energization current of coil part 112 is controlled based on the detection result of shake detection part 15 such that rotational sway of movable part 12 offsets shake of imaging module 14. In this manner, shift of the optical axis due to hand shake is corrected, and the orientation of the light axis is kept at an orientation.

In addition, since restriction part 114d of skirt member 114 limits the rotational sway of movable part 12, it is possible to prevent movable part 12 from being excessively rotationally swayed by the drop impact or the like.

In addition, the bottom surface of imaging module 14 is fixed to the top surface of holding frame portion 1211 of movable part 12 (part of the top surface of yoke 120) with a double-sided tape or resin adhesive agent. Holding frame portion 1211 is connected on the peripheral side thereof to top plate portion 121a of yoke main body 121 by way of inside droop portion 121c of yoke main body 121, top plate portion 121a being located at a position more distant from base member 111 in the Z direction than from holding frame portion 1211, that is, at a higher position than from holding frame portion 1211. Magnet part 122 is fixed to the underside of top plate portion 121a, and coil part 112 is disposed with respect to magnet part 122 such that when viewed in the Z direction coil part 112 is spaced apart from magnet part 122 and magnet part 122 is located inside coil part 112. The magnetic circuit part including magnet part 122 and coil part 112 is disposed peripherally with respect to holding frame portion 1211 (outwardly in the X and Y directions), in other words, peripherally with respect to imaging module 14. In this case, magnet part 122 and coil part 112 are located outside of the range in which imaging module 14 is movable.

In addition, in yoke 120, magnet part 122 is fixed on the underside of top plate portion 121*a* that is arranged at a height level higher than the height level of holding frame portion 1211. That is, magnet part 122 is located peripherally with respect to and higher than holding frame portion 1211 on which imaging module 14 is fixed.

As described above, the magnetic circuit part including magnet part 122 (permanent magnets 122A to 122D) and coil part 112 (tilt coils 112A to 112D) is disposed on base member 111 peripherally with respect to the lower end of imaging module 14 or holding frame portion 1211 of yoke 120 in the X and Y directions. In other words, the magnetic circuit part is not disposed in a space between base member 111 and imaging module 14 in which the height (in the Z direction) is limited.

In addition, in movable part 12, yoke 120 includes in the center thereof the recessed portion defined by yoke main body 121 (in particular, inside droop portion 121*c*) and holding frame portion 1211, and imaging module 14 is fixed within this recessed portion.

Actuator A corrects shake by tilting the driven part (imaging module 14) with the driving force of the voice coil motor including magnet part 122 and coil part 112 disposed as mentioned above. Actuator A includes: movable part 12 including frame shaped yoke 120 (holding member) on which the driven part (imaging module 14) is bonded, in which magnet part 122 is disposed to yoke main body 121 of yoke 120 (part of the holding member); fixing part 11 including base member 111 and frame shaped skirt member 114 fixed at the peripheral edge of base member 111, in which coil part 112 is disposed to base member 111; and elastic supporting part (supporting part) 13 disposed to base member 111 and configured to support movable part 12 such that movable part 12 can be tilted with respect to fixing part 11. Movable part 12 is set between base member 111 and skirt member 114. With actuator A, the number of components is reduced in comparison with the traditional construction, and consequently further height reduction and facilitation of assembling processes are achieved. In addition, camera module 100 is simply obtained by only bonding imaging module 14 with an auto-focusing function to yoke 120.

In addition, according to the embodiment of the present invention, actuator A includes: fixing member 11 including base member 111, in which one of coil part 112 and magnet part 122 is disposed on base member 111 peripherally with respect to the driven part (imaging module 14); movable part 12 including the frame shaped holding member (yoke 120) on a surface (top surface) of which facing away from base member 111 the driven part is placed, in which the other one of coil part 112 and magnet part 122 is disposed peripherally with respect to the driven part on a surface (underside) of the holding member facing base member 111; and the supporting part (elastic supporting part) 13 disposed to base member 111 and configured to support movable part 12 such that movable part 12 can be tilted with respect to fixing part 11. The holding member includes a step by which a placement region (holding frame portion 1211) for the driven part is closer to base member 111 than a disposition region (top plate portion 121*a*) for one of coil part 112 and magnet part 122 is to base member 111. With this actuator A, the placement region in yoke 120 for imaging module 14 can be lower than the disposition region for coil part 112 or magnet part 122, and therefore further height reduction can be more surely achieved. At the same time, the height of the magnetic circuit part, that is, the lengths of coil part 112 and magnet part 122 are not limited, and accordingly a decrease in the magnetic efficiency and an accompanying increase in the power consumption are not caused. That is, it is possible to secure the space in the height direction required for construction of the magnetic circuit part by utilizing room that is peripheral with respect to imaging module 14, and accordingly the construction of the magnetic circuit part itself can be enlarged in the height direction. For example, the height (length in the Z direction) of coil part 112 can be greater by increasing the number of turns of coil part 112 (tilt coils 112A to 112D), or the length in the Z direction of magnet part 122 (permanent magnets 122A to 122D) can be increased. In this way, the magnetic force can be greater, so that it is possible to improve the magnetic efficiency and/or to reduce the power consumption.

In addition, coil part 112 (tilt coils 112A to 112D) is disposed such that the winding axis of coil part 112 (tilt coils 112A to 112D) is oriented in the direction in which base member 111 and holding member (yoke) 120 face each other. Magnet part 122 (permanent magnets 122A to 122D) is disposed in such a manner as to protrude to the central portion of coil part 112 (tilt coils 112A to 112D). In this manner, coil part 112 and magnet part 122 can be enlarged in the height direction (Z direction) without coil part 112 and magnet part 122 being enlarged peripherally (in the X and Y directions). In this way, the construction of the magnetic circuit part itself can be enlarged without the disposition space in actuator A for the magnetic circuit part itself being enlarged.

While the invention made by the present inventor has been specifically described based on the preferred embodiments, it is not intended to limit the present invention to the above-mentioned preferred embodiments but the present invention may be further modified within the scope and spirit of the invention defined by the appended claims.

For example, while the actuator of the embodiment is of a so-called moving magnet type in which fixing part 11 includes coil part 112 and movable part 12 includes magnet part 122, the present invention may be applied to an actuator of a so-called moving coil type in which a fixing part includes a magnet part and a movable part includes a coil part. In this case, a yoke is also disposed to the fixing part.

While, in the embodiment, two pairs of tilt coil 112A and permanent magnet 122A and tilt coil 112C and permanent magnet 122C are disposed as the voice coil motor that rotationally sways movable part 12 around the X axis, and two pairs of tilt coil 112B and permanent magnet 122B and tilt coil 112D and permanent magnet 122D are disposed as the voice coil motor that rotationally sways movable part 12 around the Y axis, it suffices that at least one pair is disposed as each of the voice coil motors.

In addition, photo reflectors, magnetic sensors, inductance detection with a coil, strain sensors, or the like may also be adopted as shake detection part 15 instead of gyro sensors. In the case where a detection device (for example a photodetector of a photo reflector, a Hall device of a magnetic sensor or the like) is disposed to the movable part, it is preferable to output a detection signal through a print wiring board of an imaging module.

In addition, preferably, each component (in particular, magnet part 122) of actuator A is formed of a highly heat-resistant material. Soldering of a reflow type can thus be employed. In addition, as a countermeasure against noise, a conductive shield case may be provided on the outside of camera module 100.

Figure 9A:
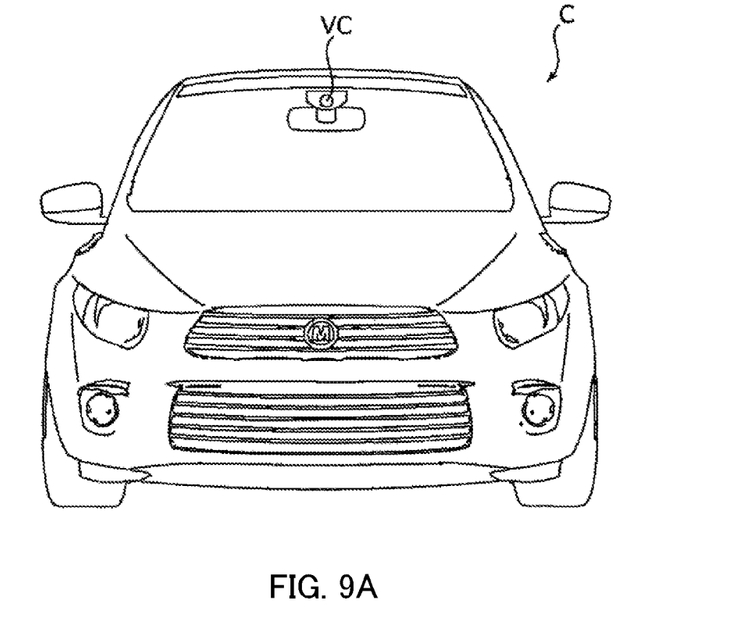
FIG. 9A is a front view of an automobile in which an onboard camera according to one embodiment of the invention is mounted.
Figure 9B:
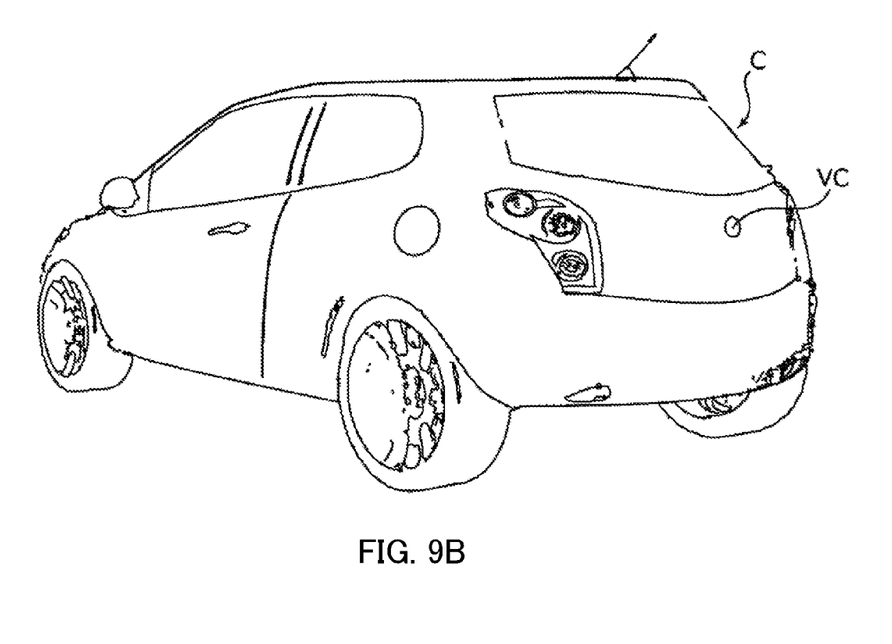
FIG. 9B is a perspective view of the automobile in which the onboard camera is mounted.

While a smartphone that is a camera-equipped mobile terminal is described in the embodiment as an example of the camera-mounted device having camera module 100, the present invention is also applicable to a camera-mounted device that is an information device or transporting device. For example, the present invention is also applicable to camera-equipped mobile phones, note-type personal computers, tablet terminals, mobile game machines, web cameras, and the like as a camera-mounted device. The present invention is also applicable to automobiles, camera-equipped onboard devices (for example, rear monitoring device or drive recorder), or the like as a camera-mounted device. FIGS. 9A and 9B illustrate vehicle C in which onboard camera module VC (Vehicle Camera) is mounted. FIG. 9A is a front view of vehicle C and FIG. 9B is a rear perspective view of vehicle C. Camera module 100 as described in the embodiment is mounted on vehicle C as onboard camera module VC, for example. Onboard camera module VC is used for rear monitoring, drive recording, collision avoidance control, automatic drive control, and the like.

The embodiment disclosed herein is merely an exemplification in every respect and should not be considered as limitative. The scope of the present invention is specified by the following claims, not by the above-mentioned description. The scope of the present invention is intended to include all modifications in so far as they are within the scope of the appended claims or the equivalents thereof.

This application is entitled to and claims the benefit of Japanese Patent Application No. 2014-260694 dated Dec. 24, 2014, the disclosure of which including the specification, drawings and abstract is incorporated herein by reference in its entirety.

INDUSTRIAL APPLICABILITY

The actuator, camera module, and camera-mounted device according to the present invention have an advantage that further height reduction can be achieved, and the actuator, camera module, and camera-mounted device are useful as a device applicable to information devices including mobile terminals such as smartphones, transporting devices such as automobiles, onboard camera-equipped devices, and the like.

REFERENCE SIGNS LIST

100 Camera module
11 Fixing part
12 Movable part
13 Elastic supporting part (supporting part)
13a Center portion
13b Inner gimbal
13c Outer gimbal
14 Imaging module (driven part)
15 Shake detection part
16 Displacement detection part
111 Base member
111a Protruding part
112 Coil part
112A, 112B, 112C, 112D Tilt coils
113 OIS print wiring board
114 Skirt member (cover member)
114a Reception port
114d Restriction part
115 Cover member
115a Opening
120 Yoke (holding member)
121 Yoke main body (holding-part main body)
121a Top plate portion (disposition region)
121b Outside droop portion
121c Inside droop portion
122 Magnet part
122A, 122B, 122C, 122D Permanent magnets
141 Lens part
142 AF actuator
143 Imaging-module print wiring board
1211 Holding frame portion (placement region)

The invention claimed is:

1. An actuator that corrects shake by tilting a driven part with a driving force of a voice coil motor including a coil part and a magnet part, the actuator comprising:
a fixing part which includes a base member, wherein one of the coil part and the magnet part is disposed on the base member peripherally with respect to the driven part;
a movable part including a frame-shaped holding member having a surface which faces away from the base member and on which the driven part is placed, the movable part being a part in which the other one of the coil part and the magnet part is disposed peripherally with respect to the driven part and on a surface of the frame-shaped holding member facing the base member; and
a supporting part disposed to the base member, and configured to support the movable part such that the movable part is tiltable with respect to the fixing part, wherein:
the frame-shaped holding member includes a step by which a placement region for the driven part is closer to the base member than a disposition region for the one of the coil part and the magnet part is to the base member.

2. The actuator according to claim 1, wherein:
the frame-shaped holding member is a yoke formed of a magnetic material.

3. The actuator according to claim 1, wherein:
the magnet part is disposed to the frame-shaped holding member; and
the coil part is disposed to the base member.

4. The actuator according to claim 1, wherein:
the frame-shaped holding member includes:
a flat frame-shaped holding frame portion to which a bottom surface of the driven part is fastened; and
a holding-part main body provided peripherally from an outer edge of the frame-shaped holding frame portion and formed in a recessed shape open toward the base member, in which a bottom surface of the recessed shape is located more distant from the base member than the frame-shaped holding frame portion is from the base member, wherein:
the holding-part main body fixedly holds the one of the coil part and the magnet part at the bottom surface.

5. The actuator according to claim 1, wherein:
the driven part is an imaging module having a lens part and an imaging device;
the supporting part is composed of an elastic supporting member having a biaxial gimbal mechanism having two rotational axes orthogonal to each other; and
the elastic supporting member is disposed within an opening inside the frame-shaped holding member such that the two rotational axes are orthogonal to a direction of an optical axis of the imaging module, and is fixed to the frame-shaped holding member via an outer gimbal portion and to the base member via a center portion.

6. The actuator according to claim 5, wherein:
the coil part and the magnet part are disposed peripherally with respect to the elastic supporting member.

7. The actuator according to claim 1, wherein:
the fixing part includes a tilt detection part that detects tilt of the driven part in a state where the voice coil motor is not being driven.

8. The actuator according to claim 1, wherein:
the fixing part further includes a frame-shaped cover member fixed at a peripheral edge of the base member; and
the movable part is set between the base member and the frame-shaped cover member.

9. The actuator according to claim 1, wherein:
the coil part is disposed such that a winding axis of the coil part is oriented in a direction in which the base member and the frame-shaped holding member face each other; and
the magnet part is disposed to protrude to a central portion of the coil part.

10. A camera module comprising:
an actuator according to claim 1;
an imaging module including a lens part and an imaging device, and bonded to the frame-shaped holding member as the driven part; and
a shake detection part that detects shake of the imaging module.

11. The camera module according to claim 10 wherein:
the shake detection part includes a gyro sensor that detects an angular velocity of the imaging module.

12. The camera module according to claim 10 further comprising:
a control part configured to control power feeding to the coil part based on a detection signal output from the shake detection part.

13. The camera module according to claim 10 wherein:
the imaging module has an auto-focusing function.

14. A camera-mounted device that is an information device or a transporting device, the camera-mounted device comprising:
a camera module according to claim 10.

* * * * *